Figure 1:
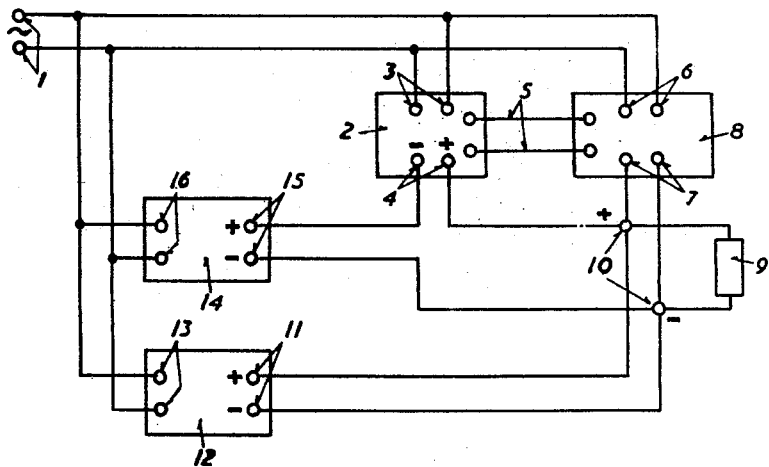

Feb. 3, 1959  J. D. WHEATLEY  2,872,636
APPARATUS FOR SUPPLYING INTERMITTENT OVERLOAD CURRENTS
FROM VOLTAGE REGULATED RECTIFIER SETS
Filed July 16, 1954

INVENTOR
JOHN DENIS WHEATLEY

BY Robert B Pearson
ATTORNEY

United States Patent Office
2,872,636
Patented Feb. 3, 1959

2,872,636
APPARATUS FOR SUPPLYING INTERMITTENT OVERLOAD CURRENTS FROM VOLTAGE REGULATED RECTIFIER SETS

John Denis Wheatley, London, England, assignor to Westinghouse Brake & Signal Company Limited, London, England Application July 16, 1954, Serial No. 443,863

Claims priority, application Great Britain July 24, 1953

3 Claims. (Cl. 321—27)

This invention relates to means for supplying intermittent over-load currents from voltage regulated rectifier sets.

Rectifier sets are required, especially for the servicing of aircraft, which have a closely regulated output voltage so long as the load does not exceed a predetermined value but which will provide large over-load currents of a short duration when called upon to do so. For example, the set may be required to supply a predetermined load at constant voltage necessary for servicing an aircraft and supplying current for such of its electrical equipment which has to be kept operating whilst the aircraft is on the ground, and yet may be called upon to provide heavy overload currents required for starting the engines.

For the first of the above requirements, that is to say the provision of a limited load at constant voltage, the load may be supplied through a rectifier the output voltage of which is maintained substantially constant, over a predetermined range of current, by known means and an eminently suitable apparatus is that comprising a main rectifier and a boost rectifier, the voltage regulation being obtained in known manner by controlling the output of the boost rectifier. With this arrangement the size of the boost rectifier and its associated control apparatus depends upon the degree of variation in load for which it is desired to compensate and, accordingly, if it is designed to cater only for the variations to be met with during normal servicing it will be unable to cope with the overload currents called for during engine starting, whereas, if the boost unit is made large enough to cater satisfactorily with the engine starter loads, it will be much larger than is required for the ordinary servicing and will thus be uneconomic.

According to the invention apparatus for supplying intermittent overload currents from a voltage regulated rectifier set comprises a main rectifier arranged to supply direct current to a load circuit at a substantially constant voltage over a predetermined range of current, in which an overload rectifier has its direct current output connected across the load circuit in parallel with the direct current output of the main rectifier and has a no-load direct current output voltage below said constant voltage.

Preferably the rectifier set comprises a main rectifier and a boost rectifier, the boost rectifier being arranged to be controlled to maintain the direct current voltage across the load circuit at a substantially constant value over a predetermined range of current and an overload rectifier having its direct current output connected across the load circuit in parallel with the main and boost rectifier and having an no-load direct current output voltage below said constant value.

Figure 2:
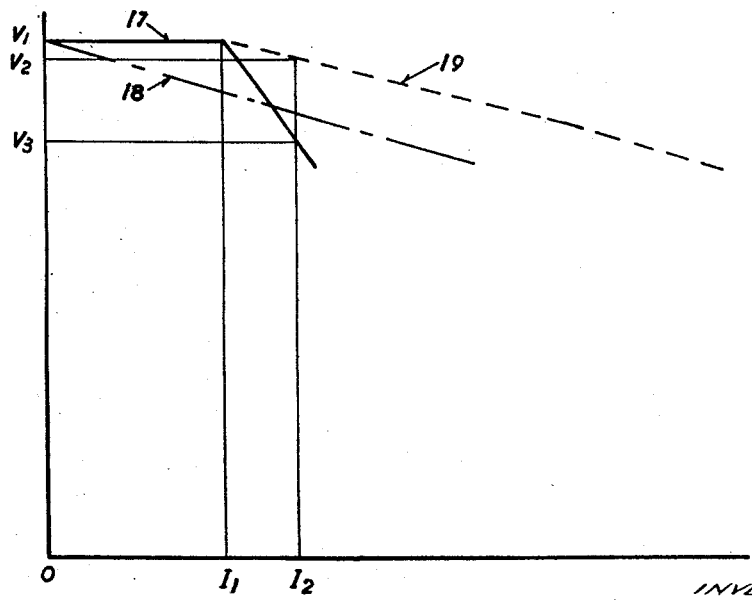

The invention is illustrated, by way of example, in the accompanying drawings, of which Figure 1 shows, in diagrammatic form, the application of the invention to a rectifier set comprising a main rectifier connected in series with a boost rectifier the output voltage of which is regulated in known manner; and Figure 2 is a diagram illustrating the voltage-current characteristics or regulation curves of the apparatus shown in Figure 1.

Referring first to Figure 1, the individual items of the apparatus indicated are of well known type and are accordingly shown in block form, the details of construction thereof forming no part of the present invention. A load circuit 9 connected across the output terminals 10 of the rectifier set is supplied with direct current from an alternating current source connected to input terminals 1 through a main rectifier 14 in series with a boost rectifier 2. It is to be understood that the block bearing the reference numeral 14 may also include, for example, a transformer the primary winding which is connected through terminals 16 to the alternating current source and the secondary of which is connected to the alternating current terminals of the main rectifier itself.

Similarly, the block reference 2 includes, besides the boost rectifier itself, means for controlling its output voltage appearing across its output terminals 4. This voltage controlling means may comprise a saturable reactor through the impedance windings of which the boost rectifier is supplied with alternating current from the source through input terminals 3. The saturable reactor may accordingly adjust the output voltage of the boost rectifier in accordance with the degree of magnetic saturation of its core, in known manner, which may itself be controlled by direct current supplied to control windings over a circuit indicated by wires 5 from a discriminator 8.

The discriminator 8 may be of any suitable well known type having alternating current energising terminals 6 connected to the alternating current source and direct current input terminals 7 connected across the output terminals 10. Variations in the load voltage are accordingly detected by the discriminator and the error signal thus obtained is fed over the circuit 5, through one or more stages of amplification (not shown) is required.

Also connected across terminals 10, like pole to like pole are the output terminals 11 of an overload rectifier 12 the input terminals 13 of which are connected to the source of alternating current. The overload rectifiers 12, which may also include a suitable energising transformer, is so designed as to have a no-load output voltage slightly less than the voltage at which the output of the main and booster rectifier is normally maintained. So long, therefore, as the boost rectifier holds the voltage across terminals 10 up to the desired value, the whole of the load current is supplied through the main and boost rectifier and the overload rectifier is on no-load, its output voltage being less than that across terminals 10.

The main rectifiers and boost rectifier combination, together with the means for controlling the output voltage of the boost rectifier, is designed to maintain the output voltage of the combination substantially constant over a predetermined range of current output. At currents beyond this range, however, the voltage drops steeply, as indicated by the characteristic 17 shown in Figure 2. In this figure, load voltage is plotted against load current and the reference numeral 17 indicates the voltage-current characteristics of the main rectifier and boost rectifier combination on its own, the characteristic 18 is that of the overload rectifier alone and the reference numeral 19 indicates the characteristic of the complete equipment. It will be observed that over the current range O–I, the discriminator 8 and boost rectifier 2 maintains the voltage across the load constant at a valve $V_1$ and, over the range, the output voltage of the overload rectifier is slightly less than $V_1$ so that the overload rectifier 12 supplies none of the load current. When the load current exceeds the value $I_1$ however, the load voltage tends to drop sharply, following the steeply sloping portion of characteristic 17, but as soon as this voltage drops to the value of the no-load voltage of the overload rectifier, which may be arranged to be as close as is practicable to $V_1$, this latter rectifier commences to supply part of the load current in accordance with the characteristic 18 so that the total load current at a given load voltage is given by the sum of the currents corresponding to that voltage on characteristics 17 and 18.

So long as the load voltage is maintained at the predetermined value, the overload rectifier delivers no current to the load and does not interfere with the regulation of that voltage. When the current drawn by the load exceeds the value above which the boost rectifier can no longer maintain the load voltage at the predetermined value, the load voltage falls below the normal regulated value to the value of the output voltage of the overload rectifier, which then supplies a proportion of the load, thus relieving the main and boost rectifiers. As soon as the overload ceases, the load voltage returns to normal and the overload rectifier again becomes idle.

Consequently if a current $I_2$, for example, is taken by the load circuit, whereas the main rectifier-boost rectifier combination on its own would be unable to maintain the voltage which would fall to a value $V_3$, the addition of the overload rectifier prevents the voltage falling below $V_2$.

In this manner the invention provides means for supplying intermittent overloads automatically without the use of apparatus incorporating moving contacts, such as contactors or relays.

It is to be understood that while the invention is described in the foregoing and illustrated in Figure 1 of the drawing as applied to a rectifier set comprising a well known mains and boost rectifier combination, it may also be applied to sets in which there is no boost rectifier, the output voltage of the main rectifier itself being maintained substantially constant over the predetermined range of load currents, the overload rectifier being arranged with its output terminals connected across the load in parallel with the main rectifier.

Furthermore, whereas in the drawing each unit is shown, for convenience, as being connected to the same alternating current source, this is not essential and each may, if desired, be connected to a separate source or to different secondary windings of a common transformer.

Having thus described my invention what I claim is:

1. Apparatus for the supply of direct current to a load circuit from an alternating current source comprising, in combination, a main rectifier adapted to supply direct current at a constant voltage up to a predetermined value of said current; an overload rectifier adapted to have a no-load direct current output voltage below but close to said constant voltage; and means establishing permanent parallel connection of the direct current outputs of said overload and main rectifiers with said load circuit, whereby the overload rectifier becomes operative to augment the direct current supplied by the main rectifier to the load circuit when said predetermined value of current is exceeded and the direct current voltage falls below said no-load voltage.

2. Apparatus for the supply of direct current to a load circuit from an alternating current source comprising, in combination, a main rectifier and a boost rectifier together supplying direct current to said load circuit; voltage regulating means for controlling the output of said boost rectifier in such a manner as to maintain the voltage across said load circuit at a constant value over a predetermined range of direct current supplied to said load circuit; and an overload rectifier having a no-load direct current output voltage below said constant value and having its direct current output connected across said load circuit in parallel with said main and boost rectifiers.

3. Apparatus for the supply of direct current to a load circuit from an alternating current source comprising, in combination, a main rectifier; a boost rectifier having its direct current output connected in series with the direct current output of the main rectifier across said load circuit; voltage regulating means for controlling the output of said boost rectifier in such a manner as to maintain the voltage across said load circuit at a constant value over a predetermined range of direct current supplied to said load circuit; and an overload rectifier having a no-load direct current output voltage below said constant value and having its direct current output connected across said load circuit in parallel with said main and boost rectifiers.

References Cited in the file of this patent

UNITED STATES PATENTS

| | | |
|---|---|---|
| 2,299,942 | Trevor | Oct. 27, 1942 |
| 2,322,955 | Perkins | June 29, 1943 |
| 2,343,411 | Grandstaff et al. | Mar. 7, 1944 |
| 2,458,516 | Klemperer et al. | Jan. 11, 1949 |